United States Patent Office 3,105,004
Patented Sept. 24, 1963

3,105,004
1,4-BIS(2-NITROVINYL)BENZENE AND DERIVATIVES THEREOF AS FUNGICIDES
William J. Pyne, Painesville, Ohio, assignor to Diamond Alkali Company, Cleveland, Ohio, a corporation of Delaware
No Drawing. Filed July 27, 1960, Ser. No. 45,556
20 Claims. (Cl. 167—30)

This invention relates to novel halo and/or nitro bis(2-nitrovinyl) benzenes and to the use of bis(nitrovinyl) benzenes and halo and/or nitro derivatives thereof as substantially non-phytotoxic pesticides, especially as fungicides.

In general, the non-phytotoxic, fungicidal compositions of this invention comprise a carrier and a fungicidal amount of a compound having the structure:

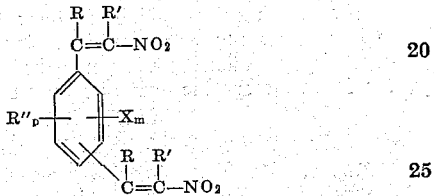

wherein R, R' and R" are the same or different radicals selected from the group consisting of hydrogen, halogen, i.e., fluorine, chlorine, bromine and/or iodine, chlorine being preferred, alkyl radicals, e.g., methyl, ethyl, propyl, butyl or the like; and aryl radicals, e.g., phenyl, naphthyl, or the like; X is halogen, i.e., fluorine, chlorine, bromine and/or iodine, chlorine being preferred, or —NO$_2$; and $m+p=4$.

Illustrative compounds of this type are the following:

I. 1,4-bis(2-nitrovinyl)benzene

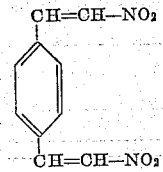

II. 2-nitro-1,4-bis(2-nitrovinyl)benzene

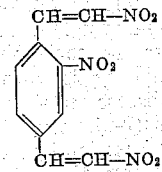

III. 2-chloro-1,4-bis(2-nitrovinyl)benzene

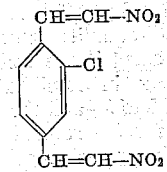

IV. 2,5-dichloro-1,4-bis(2-nitrovinyl)benzene

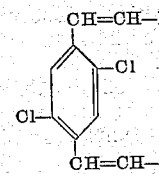

V. 2-chloro-5-nitro-1,4-bis(2-nitrovinyl)benzene

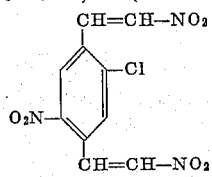

VI. 2-chloro-3-nitro-1,4-bis(2-nitrovinyl)benzene

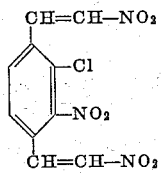

VII. 2,3,5-trichloro-1,4-bis(2-nitrovinyl)benzene

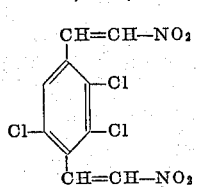

VIII. 1,4-bis(2-bromo-2-nitrovinyl)benzene

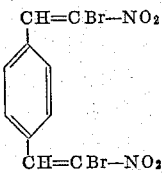

IX. 1,3-bis(2-nitrovinyl)benzene

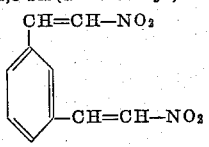

Presently preferred novel compounds of this invention embodied in pesticidal compositions of this invention are those having the following structural formula, which novel compounds also form a unitary part of this invention:

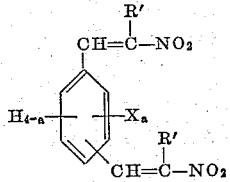

wherein X is halogen or nitro, R' is as defined hereinbefore, a preferred compound having at least one R' as hydrogen, and $a$ is a number from 1 to 4, inclusive. Preferred compounds are those having the nitrovinyl groups in the 1 and 4 positions.

Illustrative novel compounds of this invention are:

2-chloro-1,4-bis(2-nitrovinyl)benzene

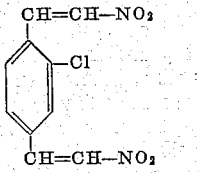

2,5-dichloro-1,4-bis(2-nitrovinyl)benzene

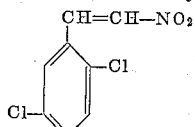

2-chloro-5-nitro-1,4-bis(2-nitrovinyl)benzene

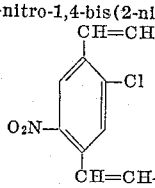

2-chloro-3-nitro-1,4-bis(2-nitrovinyl)benzene

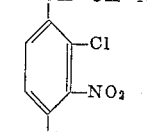

2,3,5-trichloro-1,4-bis(2-nitrovinyl)benzene

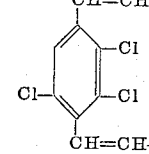

In general, compounds of this invention, comprising both the novel compounds and the other active compounds forming a part of the fungicidal compositions of this invention, may be formed by reacting an aromatic dialdehyde with a primary aliphatic nitro compound. For example, the reaction may be illustrated by the following equation:

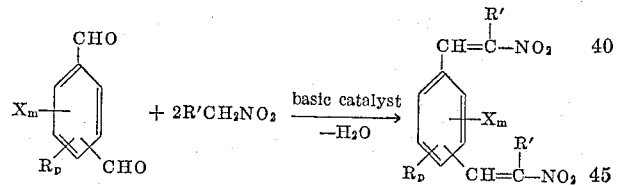

wherein R, R', p, X and m are as defined hereinbefore. Thus, it also will be appreciated that novel compounds having the structure

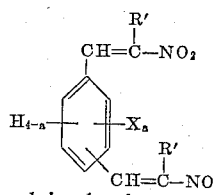

also may be formed in the foregoing manner; e.g., as indicated in the following equation:

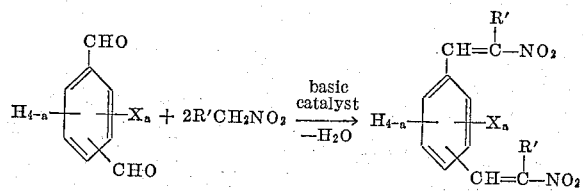

The reactions involved in preparing active compounds of this invention advantageously are carried out in the presence of a basic catalyst. Illustrative and suitable catalysts are primary and secondary lower alkyl amines such as n-butyl amine, ethylamine dimethyl amine, n-propyl amine, or the like; alkali metal hydroxides, e.g., sodium hydroxide, potassium hydroxide, lithium hydroxide, or the like; or alkali metal carbonates such as sodium carbonate, potassium carbonate, lithium carbonate, or the like. At present, n-butyl amine is a preferred catalyst.

Reaction is conveniently carried out by refluxing the reactants in water or an organic solvent such as methanol or, if desired, in the absence of a solvent. Recrystallization of the product can be affected from any suitable solvent such as nitromethane.

The compounds and compositions of this invention exhibit singular activity as foliage protectants, e.g., as non-phytotoxic foliage fungicides as well as fungicides generally. A particularly preferred composition comprises a minor proportion of 1,4-bis(2-nitrovinyl)benzene and a major proportion of a carrier, which composition exhibits a high degree of fungicidal activity with substantially no phytotoxicity, thus comprising an excellent foliage fungicide. It is quite unexpected that such compounds are non-phytotoxic since mononitrovinyl compounds generally, e.g., nitroethylenes, tend to burn and/or destroy plant foliage. In this connection, the least phytotoxicity of compounds of this invention is seen in the unsubstituted aromatic nucleus (I) and in the chlorinated compounds, e.g., III, VII, and IV.

In order that those skilled in the art may more completely understand the present invention and the preferred methods by which the same may be carried into effect, the following specific examples may be offered:

EXAMPLE 1

*Preparation of 1,4-Bis(2-Nitrovinyl)Benzene*

Part A.—1,4-bis(2-nitrovinyl)benzene is prepared by the method of Worrall, "Organic Syntheses," vol. 9, page 66 (see also Worrall, J.A.C.S. 62, 3253 (1940)).

Terephthalaldehyde (26.8 g., 0.2 mole) and nitromethane (24.4 g., 0.4 mole) are dissolved in 100 ml. of methyl alcohol at 10° C. To this solution is added 16 g. (0.40 mole) of sodium hydroxide dissolved in 50 ml. of water. After all the caustic is added, this mixture is poured into 200 ml. of dilute (50%) hydrochloric acid; there is isolated 44 g. of a solid melting at 200°–230° C. This material is recrystallized from ethyl alcohol and there is obtained 17.6 g. (40%) of a yellow solid melting at 223° C. Preparation of the desired reaction product, $C_{10}H_8N_2O_4$, is indicated through the following elemental analytical data:

| Element | Percent calculated | Percent actual |
|---|---|---|
| C | 54.8 | 54.6 |
| H | 3.63 | 3.9 |

Also isolated in this experiment is 1,4-bis(1-hydroxy-2-nitroethyl)benzene melting at 178°–180° C.

Part B.—1,4-bis(2-nitrovinyl)benzene is tested against the fungi which incite the early blight and late blight diseases of plants using the following procedures:

A tomato foliage disease test is conducted measuring the ability of 1,4-bis(2-nitrovinyl)benzene to protect tomato foliage against infection by the early blight fungus *Alternaria solani*. Tomato plants 5 to 7 inches high of the variety Bonny Best are employed. The plants are sprayed with 100 ml. of test formulation at concentrations to give at least three finite values of disease control with the dosages indicated in the following table of 1,4-bis(2-nitrovinyl)benzene in combination with 5% acetone—0.01% Triton X-155—and the balance water at 40 lbs. air pressure while being rotated on a turntable in a spray hood. After the spray deposit is dry, the treated plants and comparable untreated controls are sprayed with a spore suspension containing approximately 20,000 conidia of *A. solani* per ml. The plants are held in a saturated atmosphere for 24 hours at 70° F. to permit spore germination and infection. After 2 to 4 days, lesion counts are made on the three uppermost fully expanded leaves. Percent disease control is then calculated by basing it on the number of lesions obtained on the control plants.

Fungicidal utility is demonstrated by the ability of the test compound to protect tomato plants against the late blight fungus, *Phytophthora infestans*, by the identical procedure. However, after the spray deposit is dry, the treated plants and comparable untreated controls are sprayed with approximately 150,000 sporangia of *P. infestans* per ml. The plants are held in a saturated atmosphere for 24 hours at 60° F. to permit spore germination and infection. After 2 to 4 days, lesion counts are made on the three uppermost fully expanded leaves and percent disease control is calculated.

The results of these tests at four rates of chemical application are as follows:

| Fungus | Percent disease control @ concentration, p.p.m. | | | |
|---|---|---|---|---|
| | @ 128 p.p.m. | @ 64 p.p.m. | @ 32 p.p.m. | @ 16 p.p.m. |
| Early blight | 94 | 83 | 73 | 63 |
| Late blight | 99 | 98 | 90 | 77 |

*Part C.*—Sterile soil is infested with *Rhizoctonia solani* grown on a cornmeal-sand medium. In order to obtain the desired inoculum potential in the test, two 250 ml. flasks containing a 10-day old culture of the fungus are mixed per level flat of sterile soil. The infested soil is then placed in small Dixie cups (4 oz. squat). Treatment of the soil is accomplished by drenching 25 ml. of a test formulation on the surface of the soil in the cups. The test formulation is prepared by weighing or measuring the appropriate amount of test compound, adding acetone, then emulsifier and brought to volume with distilled water. The final concentrations are 5% acetone and 0.01% Triton X–155 by volume. When dilutions are made in this test the concentration of the emulsifier and acetone are maintained. The amount of 1,4-bis(2-nitrovinyl)benzene employed is equivalent to 64 and 32 lbs./acre. The surface area of the soil in the cups is 5.73 square inches so that it requires 0.414 mg. of test chemical per cup to achieve a rate of 1 lb./acre. After drenching, the cups are placed in a saturated atmosphere at 70° F. for 48 hours. At the end of this time, the fungus mycelium has completely overgrown the surface of the soil in the control cups. The effectiveness of the test chemical is determined by observing the cups and grading them on a scale from 0=complete inhibition of growth to 10=growth equivalent to that of the control. These grades are then expressed as percent control, 0% indicating no activity, and 100% indicating complete inhibition of mycelial growth over the soil surface. Using this procedure, at a rate of 64 lbs./acre and 32 lbs./acre 1,4-bis(2-nitrovinyl)benzene exhibits 60% and 20% control, respectively.

EXAMPLE 2

*Preparation of 2-Chloro-1,4-Bis(2-Nitrovinyl)Benzene*

*Part A.*—525 g. of 2-chloro-p-xylene dichloride is dissolved in a solution comprising 450 g. of anhydrous sodium carbonate and 6 liters of water. The mixture is then refluxed with stirring in a flask for about 8 hours, preferably until reaction completion. About 4 liters of water is then removed through distillation, the residue removed from the container, cooled to about 5° and filtered, yielding the desired diol. The product is then recrystallized from a minimum amount of water (about 1500 ml.) using decolorizing carbon to remove any color. This yields the desired 2-chloro-p-xylene-a,a'-diol ($C_8H_9ClO_2$), M.P. 101°–103° C.

0.2 mole of 2-chloroterephthalaldehyde (M.P. 75°–76° C.), prepared by refluxing 2-chloro-p-xylene-a,a'-diol in dilute nitric acid for 6 hours and recrystallizing the product from cyclohexane, is reacted with 0.4 mole of nitromethane and 1 g. of n-butylamine by heating at reflux for four hours on a steam bath. The reaction mixture is then cooled, filtered, and the solid recrystallized from nitromethane. A 35.2% pure yield is obtained, the material melting at 175° C. Analysis indicates formation of the desired 2-chloro-1,4-bis(2-nitrovinyl)benzene $$(C_{10}H_7ClN_2O_4)$$

and is as follows:

| Element | Percent calculated | Percent actual |
|---|---|---|
| C | 47.2 | 47.0 |
| H | 2.75 | 2.9 |

*Part B.*—The fabric preservation test measures the ability of test compounds to prevent deterioration of cotton duck in soil known to be infested with cellulose decomposing organisms. Duplicate strips of 8 oz. cotton duck 1" x 6", with the long dimension parallel to the warp, are treated by dipping them into a one percent solution of 2-chloro-1,4-bis(2-nitrovinyl)benzene dissolved in acetone. Each strip is dipped in solution for 10 seconds then allowed to drain until dripping stops. They are then placed on a paper towel until dry and then planted vertically in a wooden box 12" x 12" x 8" deep containing soil infested with cellulose destroying fungi. Checks are also included in the test box which is then incubated at 80° F. for two weeks. At the end of the exposure period, the test specimens are removed from the soil bed and if not completely degraded are gently washed to remove soil, dried, and breaking strength determinations made on tensilometer. It is observed that an 85-lb. tensile strength is retained after 14 days' burial as compared to an untreated buried control of 0 lb. and an unburied, untreated control at 90 lbs.

EXAMPLE 3

*Preparation of a Chloro-Nitro-1,4-Bis (2-Nitrovinyl)Benzene*

1,4-bis(2-nitrovinyl)-2-chlorobenzene (28 g., 0.110 mole) is added in small portions to 125 ml. of fuming nitric acid at 10° C. After all the solid has been added, the mixture is stirred for an additional hour. The solution is then poured on ice and a yellow solid settles out. This solid is filtered, dried, and recrystallized from 95% ethyl alcohol; there is isolated 18 g. (55%) of a yellow solid melting at 185° C., which is a chloro-nitro-1,4-bis (2-nitrovinyl)benzene.

| Element | Percent calculated | Percent actual |
|---|---|---|
| C | 40.6 | 41.4 |
| H | 1.9 | 1.9 |

EXAMPLE 4

*Preparation of 2,5-Dichloro-1,4-Bis(2-Nitrovinyl) Benzene*

Using the procedure of the foregoing example, 0.2 mole of 2,5-dichloroterephthalaldehyde (Pauli Ruggli et al., Helv. Chem. Acta, 27, pages 274–291 (1944)), prepared by heating a,a,a',a'-tetrabromo-2,5-dichloro-p- xylene with $H_2SO_4$ for 3 hours at 120°–130° C., is reacted with 0.4 mole of nitromethane and 1 g. of n-butylamine. This mixture is refluxed on a water bath for two hours and the reaction mixture cooled, filtered, and the solid recrystallized from nitromethane. The desired compound is obtained in a pure yield of 19% and melts at 260° C. Chemical analysis indicates the formation of the desired $C_{10}H_6Cl_2N_2O_4$ and is as follows:

| Element | Percent calculated | Percent actual |
|---|---|---|
| C | 41.5 | 41.7 |
| H | 2.02 | 2.0 |

EXAMPLE 5

Preparation of 2,3,5-Trichloro-1,4-Bis(2-Nitrovinyl)Benzene

*Part A.*—Using the procedure of the foregoing two examples, 0.2 mole of 2,3,5-trichloroterephthalaldehyde (German Patent 360,414), prepared by heating a,a,a′,a′,2,3,5-heptachloro-p-xylene in $H_2SO_4$ at 90°–95° C. until evolution of HCl ceases, is reacted with 0.4 mole of nitromethane and 1 g. of n-butylamine. The mixture is refluxed on a water bath for four hours and the reaction mixture is then cooled, filtered, and the solid recrystallized from nitromethane. There is thus obtained a 90% yield of the desired product melting at 323.5° C. Chemical analysis indicates formation of the desired $C_{10}H_5Cl_3N_2O_4$ and is as follows:

| Element | Percent calculated | Percent actual |
|---|---|---|
| C | 37.1 | 37.1 |
| H | 1.55 | 1.8 |

*Part B.*—Using 2,3,5-trichloro-1,4-bis(2-nitrovinyl) benzene in the test procedures of Example 1, Part B, to protect tomato foliage against infection by the early blight fungus (*Alternaria solani*) with tomato plants (variety Bonny Best) 5 to 7 inches high, and against infection by the late blight fungus (*Phytophthora infestans*) the following data, comprising calculations of percent disease control based on the number of lesions on the test plants and control plants, are obtained:

| Fungus | Percent disease control at concentration, p.p.m. | | |
|---|---|---|---|
| | 512 | 256 | 128 |
| Early blight | 98 | 90 | 52 |
| Late blight | 100 | 94 | 82 |

As the data indicate, 2,3,5-trichloro-1,4-bis(2-nitrovinyl)benzene exhibits an excellent fungicidal activity against both early and late blight fungus.

EXAMPLE 6

Using the procedure of Example 1, Part B, 1,4-bis(2-bromo-2-nitrovinyl)benzene, at dosages of 2000 p.p.m. and 400 p.p.m., respectively, gives 99% and 78% control of late blight fungus.

EXAMPLE 7

To illustrate the singular lack of phytotoxicity of the fungicidal dinitrovinyl compounds of this invention, a series of experiments are carried out wherein such compounds, as well as several mononitrovinyl compounds, are applied to the foliage of several test plants. The results, indexed comparatively, are as follows:

| Compound | Phytotoxicity (0=no injury—11=plant kill) | | | | |
|---|---|---|---|---|---|
| | Concentration (p.p.m.) | Tomato | Bean | Corn | Oats |
| $O_2N-CH=CH-C_6H_4-CH=CH-NO_2$ | 4,800 | 0 | 0 | 0 | 0 |
| $O_2N-CH=CH-C_6H_3(NO_2)-CH=CH-NO_2$ | 4,800 | 3 | 1 | 0 | 0 |
| $O_2N-CH=CH-C_6H_3(Cl)-CH=CH-NO_2$ | 4,800 | 0 | 0 | 0 | 0 |
| $O_2N-CH=CH-C_6H_2(Cl)_2-CH=CH-NO_2$ | 2,400 | 0 | 0 | 0 | 0 |
| $O_2N-CH=CH-C_6H_2(NO_2)(Cl)-CH=CH-NO_2$ | 4,800 | 0 | 0 | 0 | 0 |
| $O_2N-CH=CH-C_6H_2(Cl)_2-CH=CH-NO_2$ | 4,800 | 0 | 0 | 0 | 0 |
| $O_2N-CBr=CH-C_6H_4-CH=CBr-NO_2$ | 2,400 | 0 | 0 | 1 | 0 |
| Mononitrovinyl Compounds | | | | | |
| $O_2N-CH=CH-C_6H_4-Cl$ | 2,400 | 10 | — | 8 | 3 |
| $O_2N-CH=CH-C_6H_5$ (with Cl) | 4,800 | 11 | 11 | 11 | 8 |
| | 2,400 | 11 | 9 | 5 | 3 |

As the foregoing data clearly indicate, the compounds of this invention are characterized by an absence of phytotoxicity, while mononitrovinyl compounds exhibit substantial phytotoxicity.

It is to be understood that although the invention has been described with specific reference to particular embodiments thereof, it is not to be so limited, since changes and alterations therein may be made which are within the full intended scope of this invention as defined by the appended claims.

What is claimed is:

1. A non-phytotoxic, fungicidal composition comprising a major proportion of a finely-divided liquid or solid carrier, a minor amount of a surface active agent and a fungicidal amount of a compound having the structure:

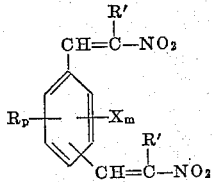

wherein R and R' are selected from the group consisting of hydrogen, halogen and hydrocarbon radicals; X is selected from the group consisting of halogen and —NO$_2$; and $m+p=4$.

2. The method of killing fungi which comprises applying thereto a fungicidal amount of a non-phytotoxic compound having the structure:

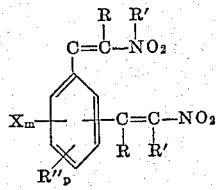

wherein R, R' and R'' are selected from the group consisting of hydrogen, halogen, alkyl and aryl radicals; X is selected from the group consisting of halogen and —NO$_2$; and $m+p=4$.

3. The method according to claim 2 wherein the compound is 1,4-bis(2-nitrovinyl)benzene.
4. The method according to claim 2 wherein the compound is 2-nitro-1,4-bis(2-nitrovinyl)benzene.
5. The method according to claim 2 wherein the compound is 2-chloro-1,4-bis(2-nitrovinyl)benzene.
6. The method according to claim 2 wherein the compound is 2,5-dichloro-1,4-bis(2-nitrovinyl)benzene.
7. The method according to claim 2 wherein the compound is chloronitro-1,4-bis(2-nitrovinyl)benzene.
8. The method according to claim 2 wherein the compound is 2,3,5-trichloro-1,4-bis(2-nitrovinyl)benzene.
9. The method according to claim 2 wherein R, R' and R'' are hydrogen, and X is halogen.
10. The method according to claim 2 wherein R, R' and R'' are hydrogen, and X is —NO$_2$.

11. The method of killing fungi which comprises applying thereto a fungicidal amount of a compound having the formula:

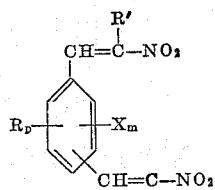

wherein R and R' are selected from the group consisting of hydrogen, halogen, alkyl and aryl radicals; X is selected from the group consisting of halogen and —NO$_2$; and $m+p=4$.

12. The method of protecting plant foliage from diseases which comprises contacting plant foliage with a fungicidal amount of 1,4-bis-(2-nitrovinyl)benzene.

13. Compounds having the structure:

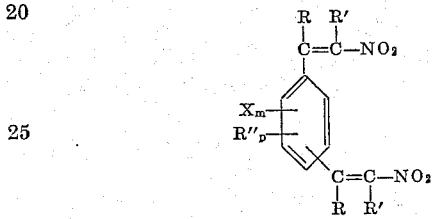

wherein R, R' and R'' are selected from the group consisting of hydrogen, halogen, alkyl and aryl radicals; X is selected from the group consisting of halogen and —NO$_2$; and $m+p=4$, with the proviso that at least one of X and R'' is halogen.

14. Compounds having the formula:

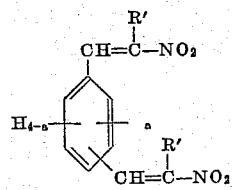

wherein R' is selected from the group consisting of hydrogen, halogen, alkyl and aryl radicals; X is selected from the group consisting of halogen and —NO$_2$, at least one X being halogen, and $a$ is a number from 1 to 4.

15. 2-chloro-1,4-bis(2-nitrovinyl)benzene.
16. 2,5-dichloro-1,4-bis(2-nitrovinyl)benzene.
17. 2-chloro-3-nitro-1,4-bis(2-nitrovinyl)benzene.
18. 2-chloro-5-nitro-1,4-bis(2-nitrovinyl)benzene.
19. 2,3,5-trichloro-1,4-bis(2-nitrovinyl)benzene.
20. Chloronitro-1,4-bis(2-nitrovinyl)benzene.

References Cited in the file of this patent
UNITED STATES PATENTS

| | | |
|---|---|---|
| 2,335,323 | Tisdale | Nov. 30, 1943 |
| 2,335,384 | Bousquet et al. | Nov. 30, 1943 |
| 2,769,745 | Hardy | Nov. 6, 1956 |
| 2,786,795 | Ligett et al. | Mar. 26, 1957 |
| 2,899,429 | Robertson | Aug. 11, 1959 |

OTHER REFERENCES

Chemical Abstracts: 34: 6625$^6$, 6625$^7$ (1940); 35: 84$^2$ (1941).